Figure 1:
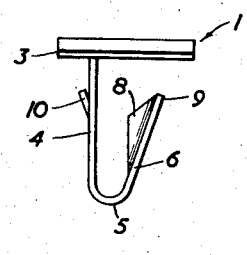

Dec. 20, 1960  L. PARKIN  2,964,814
FASTENER DEVICES FOR SECURING A CHANNEL OR LIKE
SHAPE MOULDING STRIP TO A SUPPORT
Filed Dec. 29, 1958

INVENTOR

LESLIE PARKIN

BY Walter P. Jones
ATTORNEY

United States Patent Office 2,964,814
Patented Dec. 20, 1960

2,964,814

FASTENER DEVICES FOR SECURING A CHANNEL OR LIKE SHAPE MOULDING STRIP TO A SUPPORT

Leslie Parkin, Bobbers Hill, England, assignor to United-Carr Fastener Corporation, Wilmington, New Castle, Del., a corporation of Delaware Filed Dec. 29, 1958, Ser. No. 783,241

2 Claims. (Cl. 24—73)

This invention relates to a fastener device for securing a member having channel or like shaped portions to a support such as the frame or other part of an article of furniture.

It is known to secure channel shape moulding strips to thin panels by a fastener device which includes a U-shape member adapted to snap into an aperture in the panel, the arms of the U either having shoulders for engaging round the edge of the aperture, or the free end of one of the arms being positioned to abut the rear face of the panel to secure the fastener thereto. This known fastener cannot however, be used satisfactorily for securing moulding strips to thick supports such as parts of the frame of an article of furniture, as there is no edge available for engagement by the shoulders, or alternatively it is impractical for the leg of the U to extend completely through the support to engage the rear face. In the case of such thick supports the fastener needs to be housed in a hole or recess and the known fasteners are not suitable for securing in such a hole or recess.

According to the present invention a fastener device for securing a member having 4 channel shaped portions to an apertured support comprises a base, shaped for engagement with said channel shaped portions, and an attaching portion integral with the base and including an arm having one end integrally connected to the base, and its other end integrally connected to a second arm, the latter being capable of a limited degree of flexing movement relative to the first arm and being formed with a pointed free end directed towards the base, the said arms forming a resilient U-shaped attaching portion for insertion into an aperture in a support, x from claim 1.

The free end portion of the second mentioned arm may be flat and a portion adjacent its free end bent inwardly along a diagonal extending from one corner of the free end so as to form a pointed end. If desired the first mentioned arm may be provided with an outwardly extending prong directed towards the base so as to make frictional engagement with an opposite wall of the hole or recess.

The means on the base for attachment to the moulding strip may include laterally disposed plate-like portions adapted to slide over the inner surfaces of inwardly extending flanges provided on the side edges of the moulding strip. The fastener is particularly adapted for attaching a channel shaped moulding strip to a support made of wood, synthetic plastic, or other non-metallic material of a character such that the pointed end of the second arm can dig into the surface of hole or recess. The fastener is not however limited for use with such materials but may be used with supports made of metal. In this case, the pointed end will be adapted to make frictional engagement with the wall to secure the fastener without necessarily digging into the surface of the wall.

Figure 2:
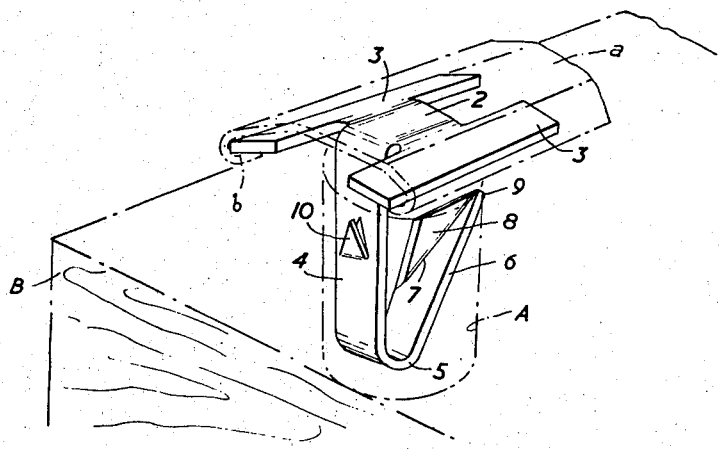

To enable the invention to be fully understood it will now be described with reference to the accompanying drawing in which Fig. 1 is a side view of a fastener according to one embodiment of the invention and Fig. 2 is a perspective view of the fastener assembled with an apertured support.

As shown in the drawing the fastener device is made of metal for example carbon steel and includes a base 1 comprising a central web 2 having a pair of integral flat parallel plate like portions 3, one being disposed at each opposite side of the web. The ends of these portions 3 extend beyond the ends of the web so that in plan the base is of H shape.

Extending integrally and substantially normally to one end of the web there is provided an arm 4 which is reversely bent at 5 to provide a second arm 6 the free end of which is directed towards the base. The two arms accordingly form in effect a U-shaped attaching member.

The second arm 6 is bent at 7 along a diagonal extending from a corner of the extreme free end so as to provide a point triangular shaped portion 8 extending substantially normally to the plane of the arm 6 and facing the other arm 4. The upper end of the portion 8 terminates in a pointed end 9. The pointed prong 10 is punched outwardly with its free end directed towards the base 1.

In use a series of fasteners are pre-assembled in a channel shaped moulding strip a by sliding the portions 3 of the base into the channels thereof to overlap the inner faces of flanges b which extend inwardly of the opposite side edges of the channel, the U-shaped attaching member then projecting outwardly of the moulding strip. As shown the said portions 3 of the base are bent or curved along the line joining the web 2 so that the said portions are disposed at a small angle to the web and displaced in a direction towards the arms 4, 6. This bending of the portions 3 ensures that they will make a good resilient frictional engagement with the flanges of the moulding strip a.

The fasteners will be positioned along the moulding strip in spaced relation according to the location of the holes or recesses A in a support B which may for example be part of a frame of an article of furniture and the bent end 5 of the arms of the fasteners are then aligned with the holes or recesses and pressure exerted on the strip moulding to force the arms into said holes or recesses. The holes or recesses will be such dimensions that as the arms 4, 5 are inserted, the arm 6 will be flexed inwardly towards the arm 4 and when the insertion is completed, the inherent resilience of the arm 6 will cause it to be urged towards the adjacent wall of the hole or recess A and its pointed end 9 will be forced into engagement therewith and tend to dig into its surface, so that the fastener will be firmly held against withdrawal. Further the prong 10 on the arm 4 will make frictional engagement with opposite wall of the hole or recess A and augment the securing section of the pointed end 9.

If the fastener is to be secured in a support of hard material such as metal which will not permit the pointed end 9 to dig in, the frictional engagement of the said pointed end will still be sufficient to hold the fastener in the hole or recess.

By forming the pointed end by bending the end portion of the arm along a diagonal the pointed end 9 is strengthened and the danger of it being broken or bent is reduced. Further the upper edge of the pointed portion adjacent to the point provides an additional surface for engaging the surface of the wall of the hole or recess.

I claim:

1. A fastener device for securing a member having channel shaped portions to an apertured support, comprising a base shaped for engagement with said channel shaped portions, and an attaching portion integral with the base and including an arm having one end integrally connected to the base and its other end integrally connected to a second arm, said second mentioned arm having a bend along a diagonal to form a triangular shaped portion extending at an angle to the plane of the arm, such that an angle of a triangle forms a pointed end, said second mentioned arm being capable of a limited degree of flexing movement relative to the first arm, the said arms forming a resilient U-shaped attaching portion for insertion into an aperture in a support.

2. A molding fastener or the like comprising a base for engagement with a molding and an attaching portion for axial insertion within an apertured support, said attaching portion being integral with said base and including a pair of spaced arms connected by a web, the first of said arms extending downward from a medial lateral portion of said base, and a second arm terminating in spaced relation to said base, said second arm having a bend along a diagonal forming a triangular shaped portion extending at an angle to the plane of the arm, such that one angle of the triangle forms a pointed terminal end, said terminal end cooperating with an outwardly extending prong on said first arm to retain said fastener in assembly.

References Cited in the file of this patent

UNITED STATES PATENTS

| | | |
|---|---|---|
| 2,596,940 | Poupitch | May 13, 1952 |
| 2,685,721 | Eves | Aug. 10, 1954 |